2 Sheets--Sheet 1.
C. E. LIPE.
Horse Hay-Rake.
No. 166,708. Patented Aug. 17, 1875.
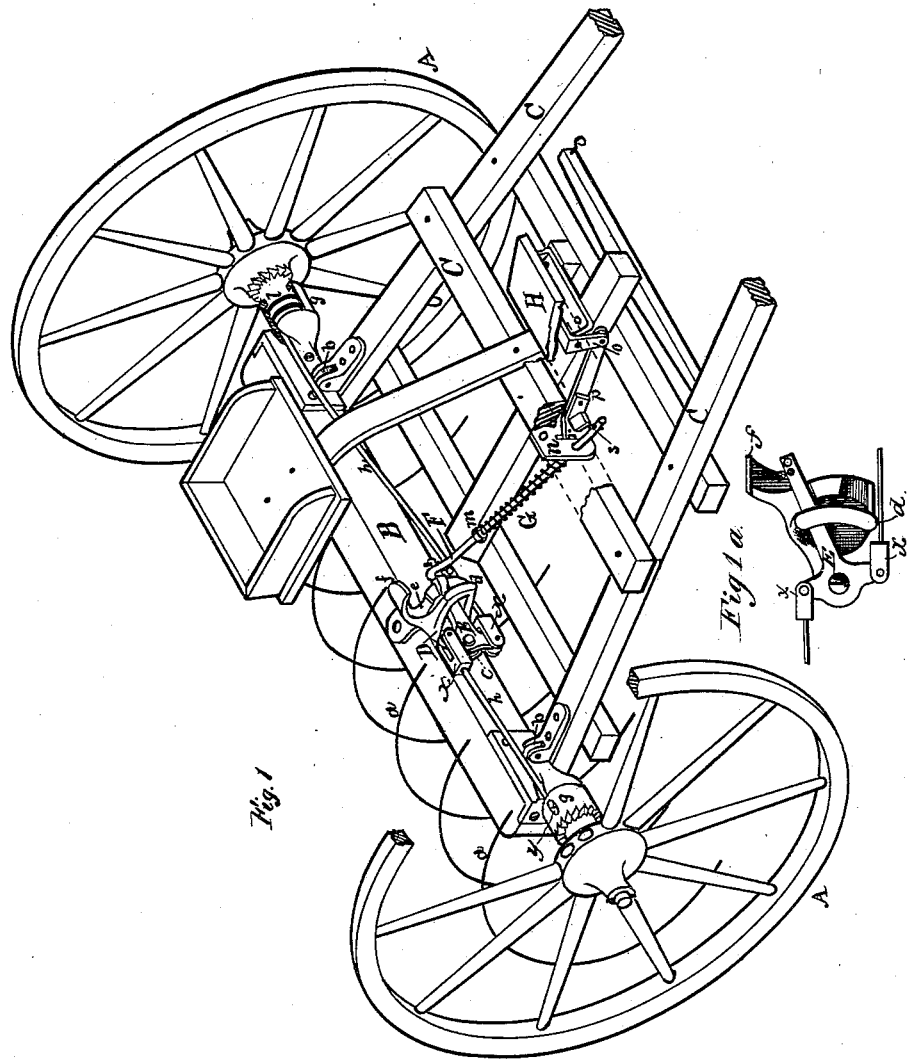
Witnesses
Harry C. Clark
H. E. Matthews
Inventor
Chas. E. Lipe

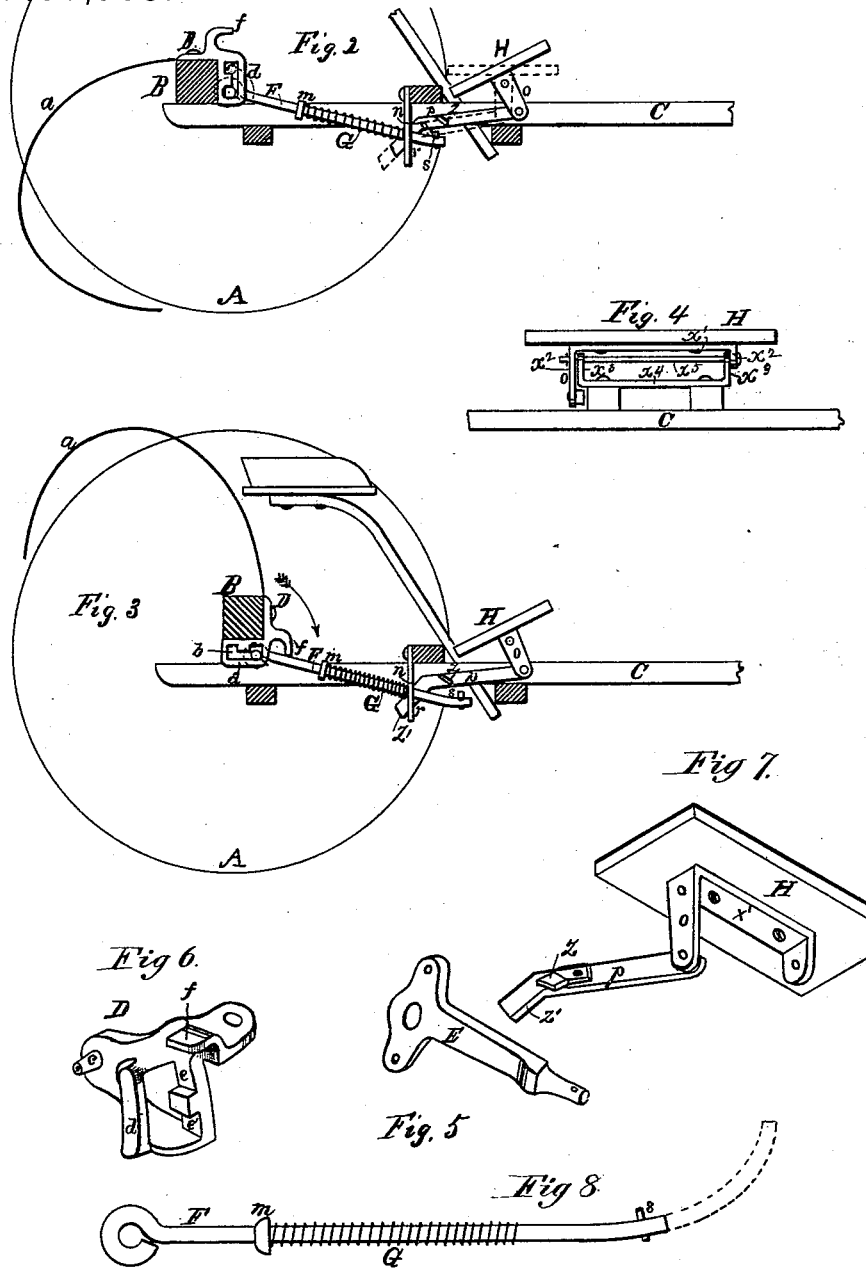
2 Sheets--Sheet 2.
C. E. LIPE.
Horse Hay-Rake.
No. 166,708. Patented Aug. 17, 1875.
Witnesses
Harry C. Clark.
H. E. Matthews.
Inventor
Chas E Lipe

UNITED STATES PATENT OFFICE.

CHARLES E. LIPE, OF SYRACUSE, NEW YORK.

IMPROVEMENT IN HORSE HAY-RAKES.

Specification forming part of Letters Patent No. 166,708, dated August 17, 1875; application filed November 14, 1874.

*To all whom it may concern:*

Be it known that I, CHARLES E. LIPE, of Syracuse, in the county of Onondaga and State of New York, have invented a new and useful Improvement in Hay-Rakes; and I do hereby declare that the following is a full and exact description of the same, reference being had to the accompanying drawings and to the letters of reference marked thereon.

This invention relates to that class of two-wheeled self-dumping rakes which are provided with clutch mechanism adapted to connect the draft-wheels with the rake-head when it is desired to give it movement for the purpose of discharging its load, suitable springs for throwing the clutches into gear when free to act, intermediate connecting-rods, and a single lever, adapted to control the movements of the clutch mechanism; and it consists, mainly, first, in the combination, with the actuating-lever, of a peculiarly-constructed foot-board and certain intermediate mechanism, by means of which the actuating-lever is released when it is desired to permit the clutch mechanism to move into gear; second, in the combination, with an actuating-lever, of a thrust-rod, adapted, by means of a suitable spring, to move the lever automatically, when the rake has completed its upward movement, into position to disconnect the clutch mechanism, and permit the rake to fall, the spring of the thrust-rod being compressed to obtain the necessary power to actuate the lever by the movement of the rake-head.

In the drawings, Figure 1 represents a perspective view of my improved rake; Figs. 2 and 3, sectional elevations, representing the rake-head in its depressed and elevated positions; Fig. 4, a front elevation of the foot-board; and Figs. 5, 6, 7, and 8, detail views of parts detached.

To enable others skilled in the art to make and use my invention, I will now proceed to describe fully its construction and manner of operation.

My invention may be generally described as follows: I employ an actuating-lever, united by proper connecting-rods to clutches upon the rake-head, having springs adapted, when free to act, to move them into gear with ratchets upon the draft-wheels, which lever is ordinarily held in proper position to disconnect the clutch mechanism by a proper notch upon a suitable holding-plate. In connection with this lever and the clutch mechanism I employ auxiliary mechanism, adapted to operate the actuating-lever for connecting and disconnecting the clutch mechanism, this auxiliary mechanism consisting of certain intermediate parts, adapted for operation by the foot of the driver, to throw the rake-head into gear, and certain automatic mechanism, operated by the movement of the rake-head, adapted to throw the latter out of gear when it has been fully elevated.

The peculiar construction of the mechanism employed will be fully described hereinafter.

A A represent the ground or draft wheels supporting the rake-head or axle B, to which are attached the teeth $a\ a$ in any approved manner. C C represent the frame and thills, united to the rake-head by means of the hinge-joints $b\ b$, Fig. 1, upon which the driver's seat and foot-board are supported, as shown. D represents a casting secured to the rake-head in any proper manner, and provided with the stud $c$, guard-bar $d$, segment having notches $e$ $e'$, and releasing pad or arm $f$. E represents the actuating-lever, of T-shaped form, which is loosely pivoted upon the stud $c$, as shown. $h\ h$ represent connecting-rods, united at one end to one of the right-angled arms of the lever E by an intermediate clevis-iron, $x$, and at the other, by means of a pin, $y$, set at right angles thereto, to the sleeve of the rake-head clutch $g$, the pin resting in a slot of the sleeve, as shown in Fig. 1, for the purpose of permitting the clutch mechanism to become disengaged when the machine is backing or turning. These sleeves are adapted to move longitudinally, to engage with the ratchets of the wheels, in the usual well-known manner. The long arm of the lever is adapted to rest in the notches $e\ e'$ of the casting D, as shown. $l$, Fig. 1, represents an actuating-spring, by means of which, when free to act, the clutches are thrown into gear.

The spring-clutches, the connecting-rods, and a lever for actuating these parts I do not claim as my invention.

The auxiliary mechanism employed in connection therewith is believed to be novel, and will now be described.

F represents a rod, which is loosely attached at one end to the long arm of the lever E, and supported at the other by the plate $n$, through a proper opening in which it projects, as shown. It is provided at a proper point with a shoulder, $m$, and near its front end with a pin, $s$, as shown. G represents a coiled spring surrounding the rod F, which bears at its ends against the shoulder $m$ and plate $n$, as shown. H represents the foot-board, provided with a suitable plate, $x^1$, having dependent arms $x^2$, which are pivoted to the upwardly-projecting arms $x^3$ of the standard $x^4$ by means of the rod $x^5$, as shown. One of these dependent arms is extended in a downward direction, for the purpose of forming a lever, to the lower end of which is pivoted a pulling-bar, $p$, as shown. This bar $p$ is provided with a right-angled plate, $z$, downwardly inclined from the rear to the front, as shown in Figs. 2 and 3, and has also its rear end, which is supported in a proper slot in the plate, bent to form a cam-surface, $z'$, as shown.

The operation is as follows: The machine being in operation, and it being desired to elevate the rake, the foot-board is moved by the feet of the driver into its forward position, as shown in dotted lines, Fig. 2, by means of which the pulling-bar $p$ is moved in a rearward direction sufficiently far to permit its plate $z$ to drop in behind the pin $s$ of rod F. The foot-board then being moved into its rearward position, as shown in full lines, Fig. 2, the pulling-bar $p$ is drawn forward, and consequently, also, the rod F, with which it is engaged. The forward movement, however, of the pulling-bar $p$ causes its cam-surface to come in contact with the lower edge of the slot in the plate $n$, by which means its rear end is elevated, and its plate $z$ disengaged from the pin $s$ of the rod F, so that the latter is released, and is free to be moved by the reaction of the spring G, which has been compressed by the action described. Before this disengagement takes place, however, the rod F receives sufficient movement to draw out the long arm of the actuating-lever from its retaining-notch in the holding-plate, so that it is free to be drawn into its raised position in the upper notch by the action of the clutch-springs, as shown in Fig. 1$^a$. The clutches being thrown into gear, the rake-head is connected to the draft-wheels, and given its proper upward movement to discharge its load. In the upward movement of the rake-head, the end of the actuating-lever, and also the rod F, attached thereto, are caused to move in an arc of a circle, (shown in dotted lines, Fig. 2,) and consequently the latter is moved in a forward direction against the pressure of the spring G, which is consequently strongly compressed, as shown in Fig. 3. When the rake is fully elevated the arm $f$ of the casting D comes in contact with the rod F, as shown in Fig. 3, and pushes the same forward sufficiently far to force the end of the actuating-lever attached thereto out of its holding-notch, by means of which it is released, and also the thrust-rod attached thereto, so that the lever is instantly returned to its normal position by the reaction of the compressed spring. The return of the lever to its normal position causes the clutch mechanism to be disengaged, and consequently the rake-head is permitted to fall. By means of the cam-surface upon the pulling-bar $p$ the plate $z$ of the latter is sufficiently elevated, when not in actual use, to avoid interference with the movements of rod F. The lever is so located upon the rake-head, it will be observed, that when in its normal position in the lower notch, as shown in Fig. 1, the end of the thrust-rod is held in an axial line with the hinge-joints $b\ b$, by means of which arrangement the rake-head is free to move relatively to the frame without affecting in any manner the spring G. If desired, the foot-board may be dispensed with, the thrust-rod itself being extended forward into proper position to be moved by the foot of the driver, as indicated in dotted lines, Fig. 8.

Some of the advantages of this construction are as follows: By the employment of the thrust-rod and spring, in the manner described, the power necessary to actuate the lever for disconnecting the clutch mechanism is obtained from the movement of the machine itself, instead of from the hand of the operator. The machine is adapted for operation entirely by the foot of the driver, so that the hands are left free for other purposes. The thrust-rod, from its construction and arrangement, is adapted to hold securely the actuating-lever in either notch in which it may be placed, and also, when compressed by the movement of the rake-head and then released, to actuate the lever to disconnect the clutch mechanism against the resistance of the clutch-springs.

The relative arrangement of the thrust-rod and lever is such that, although the direction of the movement of the clutch-springs is at right angles to the direction of the movement of the thrust-rod, still the latter, in consequence of the arrangement described and the construction of the intermediate lever E, is adapted to exert its thrust to overcome the resistance of the springs without side thrust and consequent friction and loss of power.

Having thus fully described my invention, what I claim as new, and desire to secure by Letters Patent, is—

1. In combination with the lever controlling the movements of the clutch mechanism, the thrust-rod F, spring G, and moving rake-head B, whereby the rod and spring are adapted, by the movement of the rake-head, to actuate the lever to disconnect the clutch mechanism, substantially as described.

2. In combination with the actuating-lever controlling the movements of the clutch mechanism, the moving rake-head, the thrust-rod, and spring, automatic mechanism $f$, substantially as described, for releasing the thrust-rod when the rake-head is fully elevated, substantially as described.

3. The combination of the foot-board H, the pulling-bar $p$, the connecting thrust-rod F, and the actuating-lever E, substantially as described.

4. The combination of the T-shaped bell-crank lever with the rods connecting the same to the clutch mechanism and the thrust-rod, the parts being relatively so arranged that the direct action of the thrust-rod is exerted upon the lever at right angles thereto, substantially as described.

5. The casting D, having the stud $c$, guard-bar $d$, segment with notches $e\ e'$, and arm $f$, as described.

This specification signed and witnessed this 14th day of November, 1874.

CHARLES E. LIPE.

Witnesses:
 HARRY C. CLARK,
 H. E. MATTHEWS.